United States Patent
Tanabe

(10) Patent No.: US 9,261,529 B2
(45) Date of Patent: Feb. 16, 2016

(54) ACCELERATION SENSOR

(71) Applicant: RENESAS ELECTRONICS CORPORATION, Kawasaki-shi, Kanagawa (JP)

(72) Inventor: Akira Tanabe, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 349 days.

(21) Appl. No.: 14/013,350

(22) Filed: Aug. 29, 2013

(65) Prior Publication Data

US 2014/0060187 A1    Mar. 6, 2014

(30) Foreign Application Priority Data

Aug. 31, 2012    (JP) .................. 2012-190966

(51) Int. Cl.
  *G01P 15/08*    (2006.01)
  *G01P 15/00*    (2006.01)

(52) U.S. Cl.
  CPC ........... *G01P 15/0897* (2013.01); *G01P 15/008* (2013.01)

(58) Field of Classification Search
  CPC .................................................. G01P 15/008
  USPC ..................................................... 73/514.09
  See application file for complete search history.

(56) References Cited

U.S. PATENT DOCUMENTS

| 7,424,826 B2 * | 9/2008 | Hua .................. G01P 15/18 |
| | | 73/514.09 |
| 7,555,944 B2 | 7/2009 | Nakano et al. |
| 2013/0133425 A1 * | 5/2013 | Lin .................. G01P 15/008 |
| | | 73/514.09 |

FOREIGN PATENT DOCUMENTS

| JP | 2000-193677 A | 7/2000 |
| JP | 2006-258455 A | 9/2006 |

* cited by examiner

*Primary Examiner* — John Chapman, Jr.
(74) *Attorney, Agent, or Firm* — McDermott Will & Emery LLP

(57) ABSTRACT

An acceleration sensor includes an outer frame body, a heating element, a first temperature sensing element for temperature measurement and a second temperature sensing element for temperature measurement, and an operational amplifier. In the outer frame body, a fluid chamber capable of sealing a fluid inside thereof is formed. The heating element is formed on a circuit mounting surface which is a specific inner wall surface of a plurality of inner wall surfaces defining the fluid chamber. The first temperature sensing element and the second temperature sensing element are formed on the circuit mounting surface. The distance from the first temperature sensing element to the heating element is shorter than the distance from the second temperature sensing element to the heating element. The operational amplifier calculates a difference between a measurement result by the first temperature sensing element and a measurement result by the second temperature sensing element.

6 Claims, 16 Drawing Sheets

ACCELERATION SENSOR

CROSS-REFERENCE TO RELATED APPLICATION

The disclosure of Japanese Patent Application No. 2012-190966 filed on Aug. 31, 2012 including the specification, drawings and abstract is incorporated herein by reference in its entirety.

BACKGROUND

The present invention relates to an acceleration sensor that detects an acceleration of an object.

As this type of technique, Japanese Patent Laid-Open No. 2000-193677 (Patent Document 1) discloses a sensor element in which there are provided a heater resistor for producing heat and a pair of temperature-detecting resistors sandwiching the heater resistor for producing heat, over one plane inside a vessel filled with a fluid. If the sensor element receives acceleration in a state where the heater resistor for producing heat is caused to produce heat, the convection direction of the fluid changes and a difference is caused between the resistance values of the pair of temperature-detecting resistors. By detecting the difference between the resistance values, it is possible to detect the acceleration acting on the sensor element.

SUMMARY

However, with the configuration of the above-described Patent Document 1, it is possible to detect only the acceleration component in a direction parallel to the one plane over which the heater resistor for producing heat and the pair of temperature-detecting resistors are arranged.

The other problems and the new features will become clear from the description of the present specification and the accompanying drawings.

According to an embodiment, the acceleration sensor includes an outer frame body in which a fluid sealing chamber capable of sealing a fluid inside thereof is formed, a heating element formed on a specific inner wall surface which is a specific inner wall surface of a plurality of inner wall surfaces defining the fluid sealing chamber, a first temperature sensing element for temperature measurement and a second temperature sensing element for temperature measurement which are formed on the specific inner wall surface, with the distance from the first temperature sensing element to the heating element being shorter than the distance from the second temperature sensing element to the heating element, and a difference operation circuit configured to calculate a difference between a measurement result by the first temperature sensing element and a measurement result by the second temperature sensing element. According to another embodiment, the acceleration sensor includes an outer frame body in which a fluid sealing chamber capable of sealing a fluid inside thereof is formed, a heating element formed on a specific inner wall surface which is a specific inner wall surface of a plurality of inner wall surfaces defining the fluid sealing chamber, a pair of first temperature sensing elements for temperature measurement and a pair of second temperature sensing elements for temperature measurement which are formed on the specific inner wall surface, with the pair of first temperature sensing elements being arranged at the same distance from the heating element, the pair of first temperature sensing elements being arranged so as to sandwich the heating element, the pair of second temperature sensing elements being arranged at the same distance from the heating element, the pair of second temperature sensing elements being arranged so as to sandwich the heating element, and the distance from the pair of first temperature sensing elements to the heating element being shorter than the distance from the pair of second temperature sensing elements to the heating element, a first sum total operation circuit configured to calculate a sum of measurement results by the pair of first temperature sensing elements, a second sum total operation circuit configured to calculate a sum of measurement results by the pair of second temperature sensing elements, and a difference operation circuit configured to calculate a difference between a calculation result by the first sum total operation circuit and a calculation result by the second sum total sum operation circuit.

By the calculation result by the difference operation circuit, it is possible to detect the acceleration in the direction orthogonal to the specific inner wall surface.

DETAILED DESCRIPTION

First Embodiment

Hereinafter, a First Embodiment will be explained with reference to FIG. 1 to FIG. 6.

Figure 1:
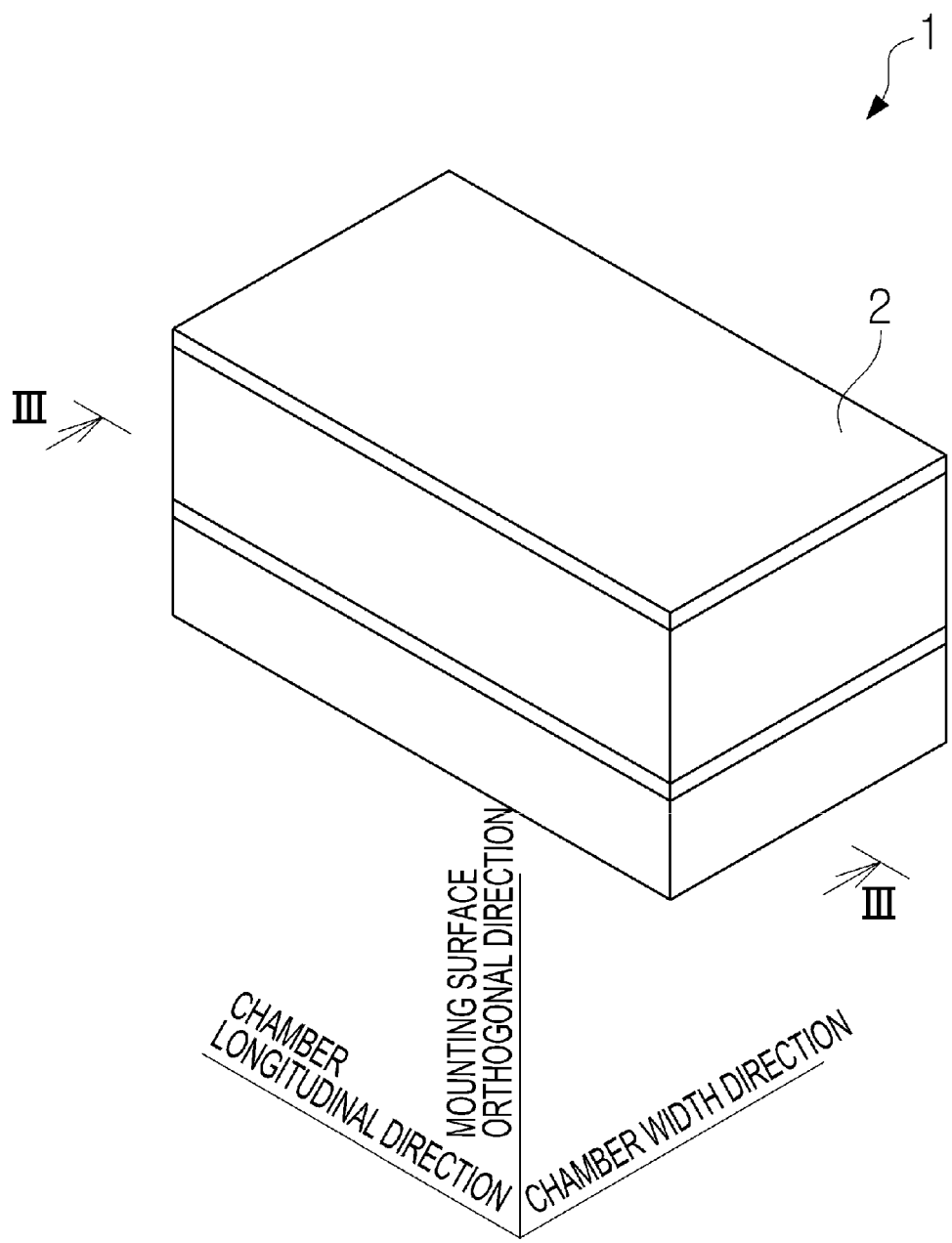
FIG. 1 is a perspective view of an external appearance of an acceleration sensor (First Embodiment)
Figure 2:
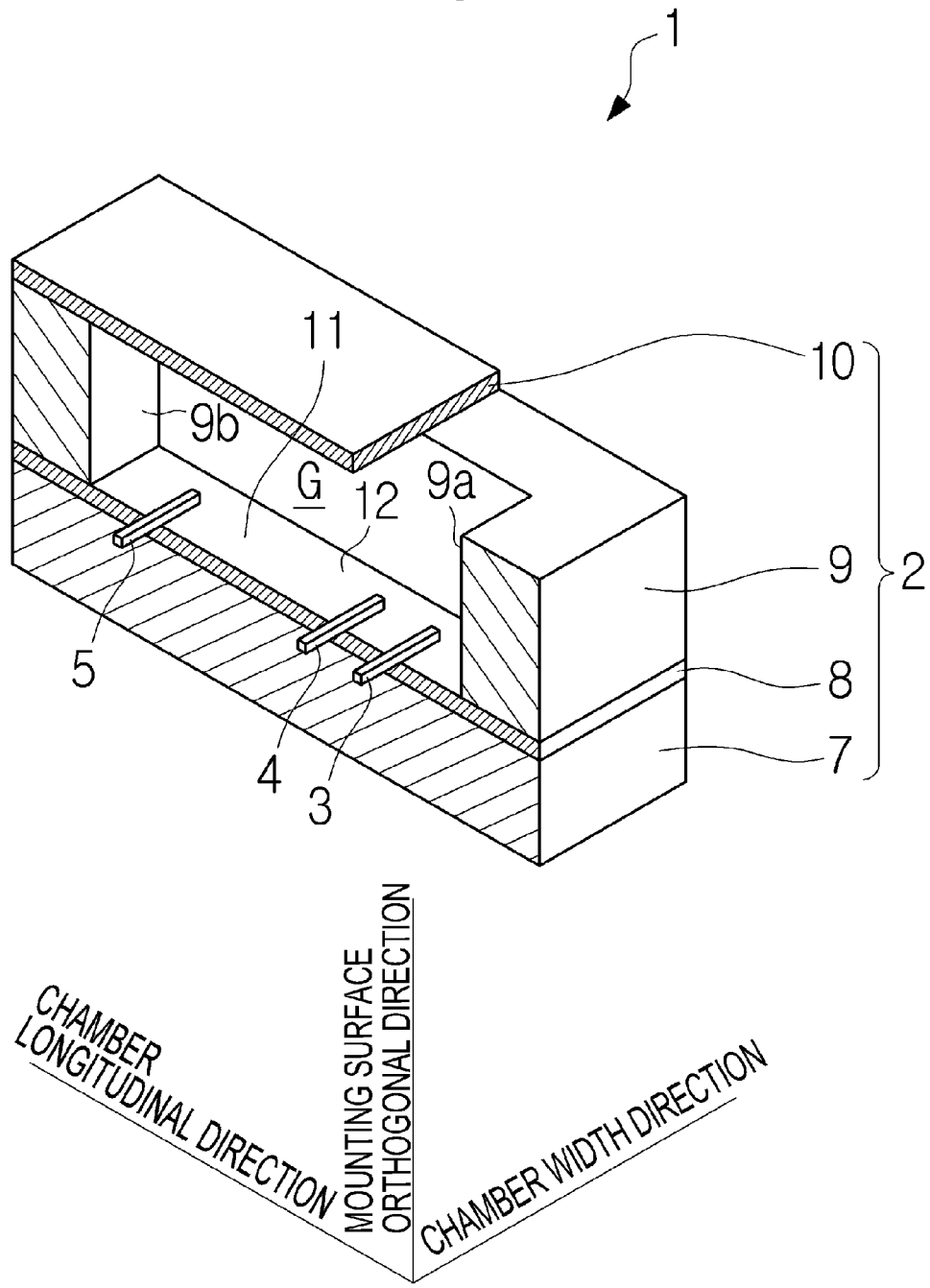
FIG. 2 is a partially cutaway perspective view of the acceleration sensor (First Embodiment)
Figure 6:
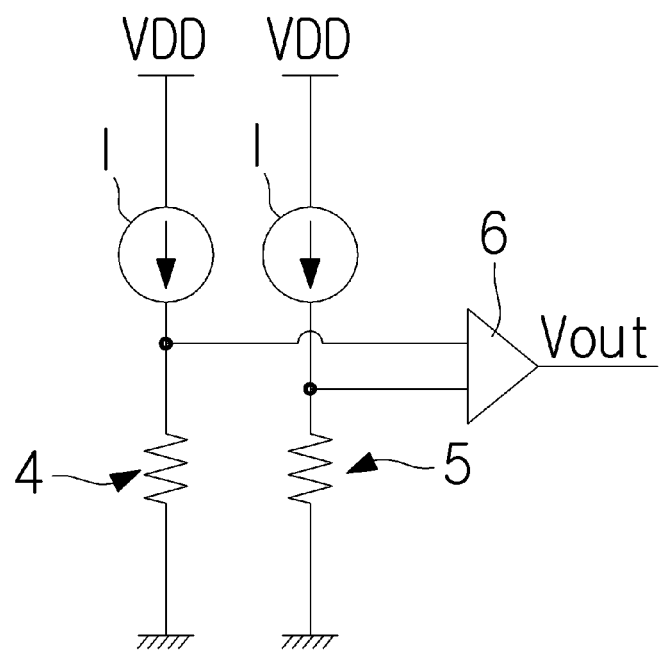
FIG. 6 is a circuit diagram of the acceleration sensor (First Embodiment)

As shown in FIG. 1, FIG. 2, and FIG. 6, an acceleration sensor 1 includes an outer frame body 2, a heating element 3, a first temperature sensing element 4, a second temperature sensing element 5, and an operational amplifier (difference operation circuit).

As shown in FIG. 2, the outer frame body 2 includes a Si substrate 7 (semiconductor substrate), a first insulating layer 8, a second insulating layer 9, and a third insulating layer 10, laminated in this order. The second insulating layer 9 is formed into the shape of a ring when viewed in the lamination direction. Due to this, inside the outer frame body 2, a fluid chamber 11 capable of sealing a gas G (fluid) is formed. In the present embodiment, the fluid chamber 11 is formed into the form of substantially a cuboid. On a circuit mounting surface 12 which is an inner wall surface closest to the Si substrate 7 of a plurality of inner wall surfaces defining the fluid chamber 11, the heating element 3, the first temperature sensing element 4, and the second temperature sensing element 5 are arranged. In the present embodiment, the gas G is an inert gas such as nitrogen or argon. By selecting such an inert gas, it is possible to prevent corrosion of the heating element 3, the first temperature sensing element 4, and the second temperature sensing element 5.

Figure 3:
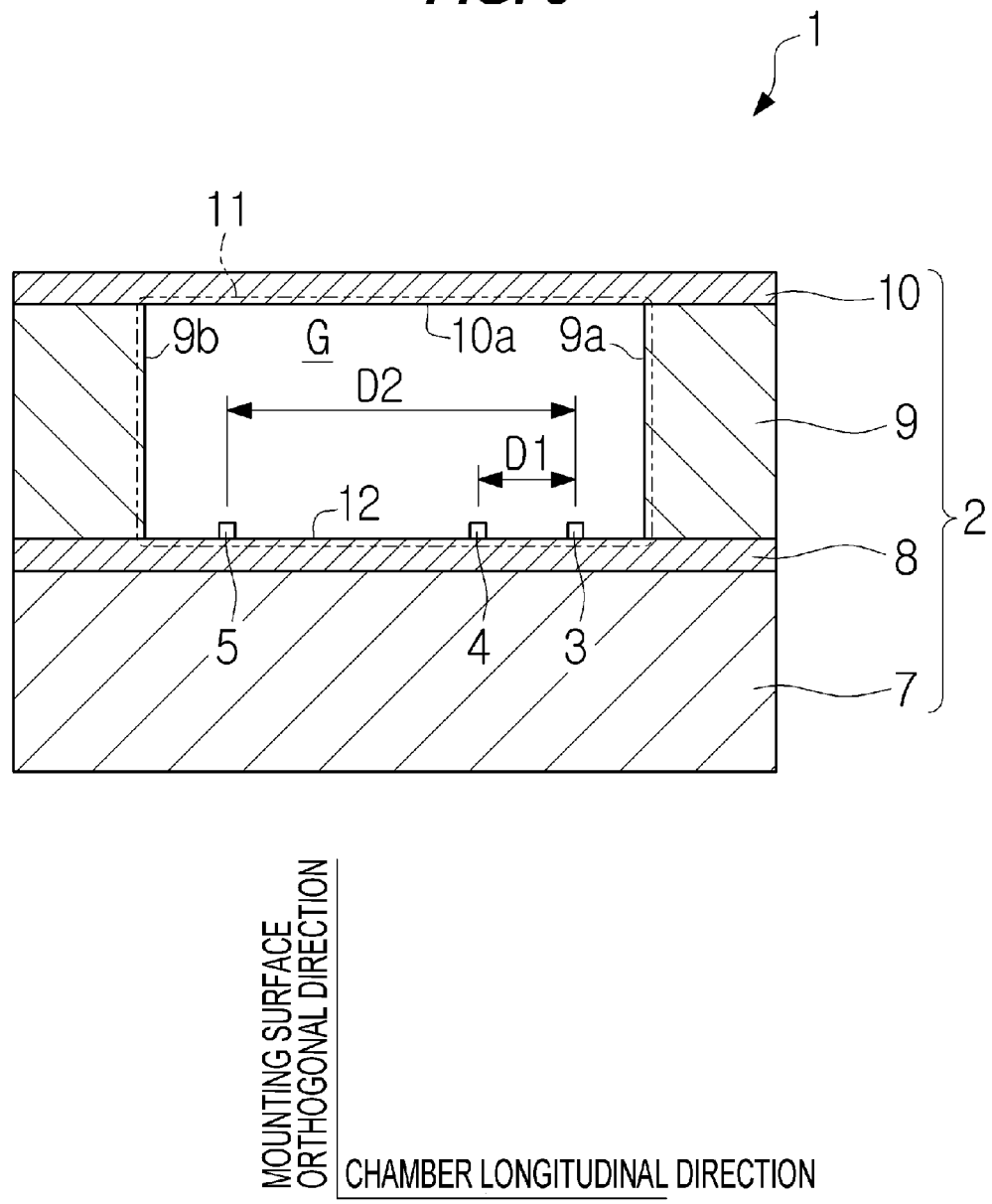
FIG. 3 is a cross-sectional view along a III-III line in FIG. 1 (First Embodiment)

Here, "mounting surface orthogonal direction", "chamber longitudinal direction", and "chamber width direction" are defined. The "mounting surface orthogonal direction" is a direction orthogonal to the circuit mounting surface 12. Of the mounting surface orthogonal directions, the direction in which the first insulating layer 8 is viewed from the third insulating layer 10 is referred to as a mounting surface approaching direction, and the direction in which the third insulating layer 10 is viewed from the first insulating layer 8 is referred to as a mounting surface leaving direction. The "chamber longitudinal direction" is the longitudinal direction of the fluid chamber 11 in the form of substantially a cuboid. The "chamber width direction" is the width direction of the fluid chamber 11 in the form of substantially a cuboid. The mounting surface orthogonal direction, the chamber longitudinal direction, and the chamber width direction have a relationship of being orthogonal to one another. In FIG. 3 and the subsequent diagrams, for convenience of explanation, the fluid chamber 11 is shown by a two-dot chain line drawn so as to surround the fluid chamber 11.

As shown in FIG. 2 and FIG. 3, the second insulating layer 9 has a small inner wall surface 9a and a small inner wall surface 9b defining the fluid chamber 11 in the chamber longitudinal direction. The small inner wall surface 9a and the small inner wall surface 9b are surfaces parallel to each other. The third insulating layer 10 has a ceiling surface 10a defining the mounting surface leaving direction side of the fluid chamber 11. The ceiling surface 10a is a surface parallel to the circuit mounting surface 12.

As shown in FIG. 2, the heating element 3, the first temperature sensing element 4, and the second temperature sensing element 5 each have a shape elongated along the chamber width direction. Then, the heating element 3, the first temperature sensing element 4, and the second temperature sensing element 5 are each formed over the circuit mounting surface 12 so as to be parallel to the circuit mounting surface 12. As shown in FIG. 2 and FIG. 3, the heating element 3, the first temperature sensing element 4, and the second temperature sensing element 5 are arranged in this order from the small inner wall surface 9a toward the small inner wall surface 9b. The heating element 3, the first temperature sensing element 4, and the second temperature sensing element 5 are arranged side by side in a line along the chamber longitudinal direction. The heating element 3 is arranged in the vicinity of the small inner wall surface 9a. The first temperature sensing element 4 is arranged in the vicinity of the heating element 3. The second temperature sensing element 5 is arranged in the vicinity of the small inner wall surface 9b. Consequently, a distance D1 from the first temperature sensing element 4 to the heating element 3 is shorter than a distance D2 from the second temperature sensing element 5 to the heating element 3.

Figure 4:
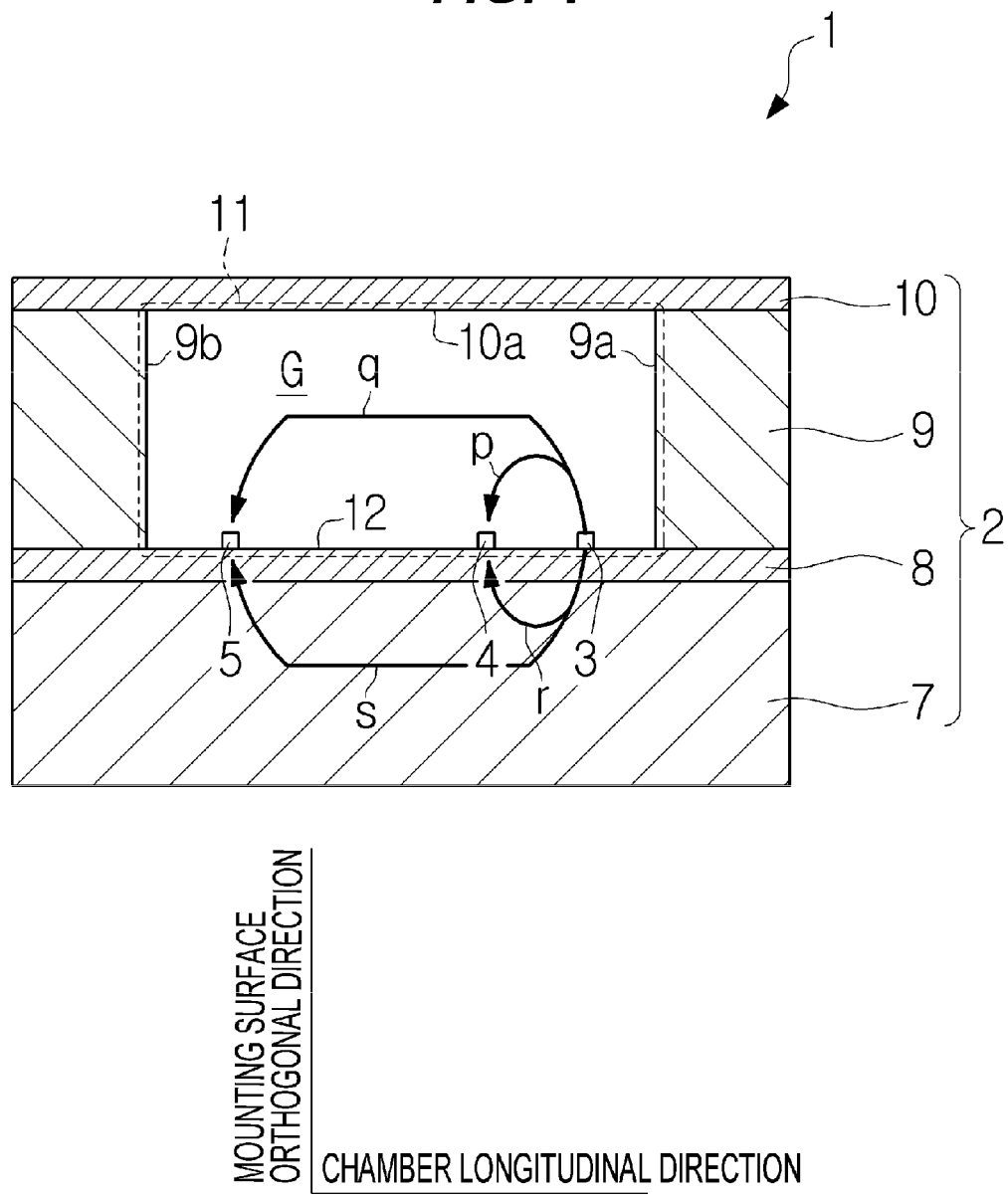
FIG. 4 is a cross-sectional view when movement of heat is imaged (First Embodiment)

With the above configuration, when the heating element 3 is caused to produce heat by causing a current to flow through the heating element 3, a heat-transfer phenomenon as shown by thick lines in FIG. 4 occurs. In FIG. 4, a heat-transfer path from the heating element 3 to the first temperature sensing element 4 via the gas G sealed in the fluid chamber 11 is shown by a heat-transfer path p. In the same manner, a heat-transfer path from the heating element 3 to the second temperature sensing element 5 via the gas G sealed in the fluid chamber 11 is shown by a heat-transfer path q. In the same manner, a heat-transfer path from the heating element 3 to the first temperature sensing element 4 via the Si substrate 7 and the first insulating layer 8 is shown by a heat-transfer path r. In the same manner, a heat-transfer path from the heating element 3 to the second temperature sensing element 5 via the Si substrate 7 and the first insulating layer 8 is shown by a heat-transfer path s.

Here, the heat-transfer path r and the heat-transfer path s are not affected at all even if the acceleration sensor 1 is accelerated in any direction. In contrast to this, the heat-transfer path p and the heat-transfer path q are affected in a variety of manners by the acceleration of the acceleration sensor 1 since the gas G sealed in the fluid chamber 11 moves if the acceleration sensor 1 is accelerated in any of the directions. Note that, generally, the thermal conductivity of the Si substrate 7 and the first insulating layer 8 is higher than that of the gas G. Consequently, the conduction of heat from the heating element 3 to the first temperature sensing element 4 and from the heating element 3 to the second temperature sensing element 5 is mainly through the heat-transfer path r and the heat-transfer path and is subordinately through the heat-transfer path p and the heat-transfer path q.

Figure 5A:
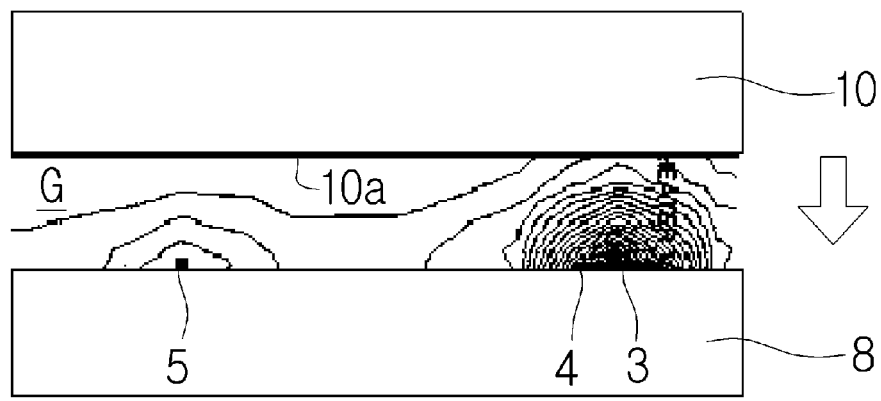
FIG. 5A is a contour chart of a temperature distribution when the acceleration is in the downward direction.
Figure 5B:
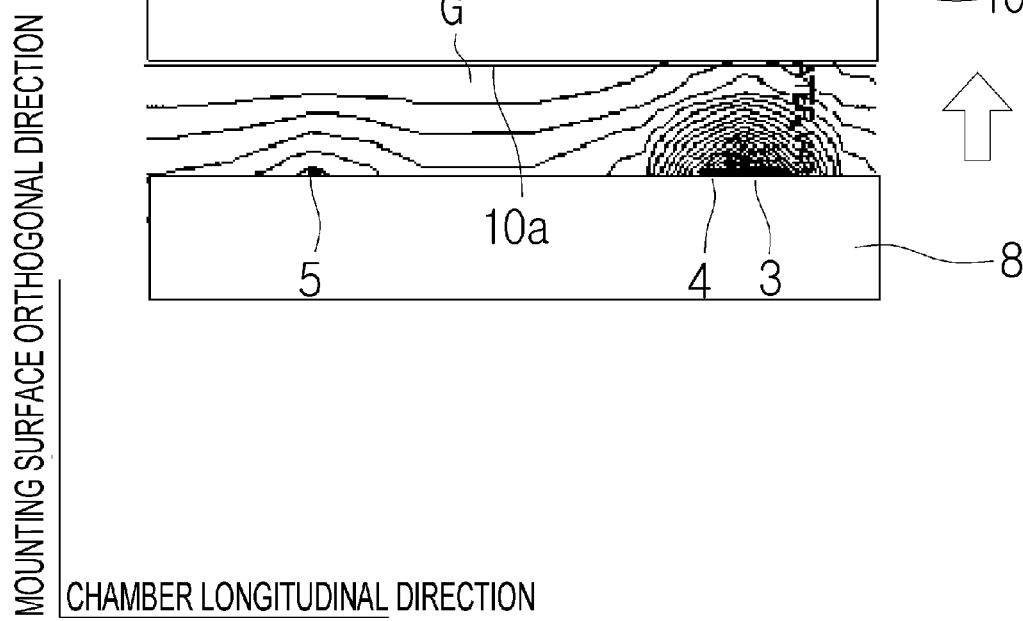
FIG. 5B is a contour chart of a temperature distribution when the acceleration is in the upward direction (First Embodiment)

FIG. 5A shows, by a contour chart, a temperature distribution when the acceleration acting on the acceleration sensor 1 is in the mounting surface approaching direction. FIG. 5B shows, by a contour chart, a temperature distribution when the acceleration acting on the acceleration sensor 1 is in the mounting surface leaving direction. The predominant heat-transfer path is the heat-transfer path r and the heat-transfer path s shown in FIG. 4, and thus, in FIG. 5A and FIG. 5B, the temperature in the vicinity of the first insulating layer 8 is uniformly high and the temperature in the vicinity of the third insulating layer 10 is uniformly low. Here, the specific gravity of the gas G heated by the heating element 3 becomes low, and thus the gas G tries to move in the direction opposite to the direction of the acceleration acting on the gas G. That is, in the case where the acceleration acting on the gas G is in the mounting surface approaching direction as in FIG. 5A, the gas G tries to move in the mounting surface leaving direction, and in the case where the acceleration acting on the gas G is in the mounting surface leaving direction as in FIG. 5B, the gas G tries to move in the mounting surface approaching direction. Consequently, as shown in FIG. 5A, in the case where the acceleration acting on the gas G is in the mounting surface approaching direction, the difference in the temperature in the mounting surface orthogonal direction within the fluid chamber 11 is smaller than that in the case where the acceleration acting on the gas G is in the mounting surface leaving direction.

Returning to FIG. 4, when making a comparison between the heat-transfer path p from the heating element 3 to the first temperature sensing element 4 and the heat-transfer path q from the heating element 3 to the second temperature sensing element 5, as will be found by a comparison between FIG. 4 and FIGS. 5A and 5B, the latter is more likely to be affected by the acceleration in the mounting surface orthogonal direction than the former. This is because, in the case of the heat transfer from the heating element 3 to the first temperature sensing element 4, the heat transfer becomes strong and predominant in the chamber longitudinal direction, whereas in the case of the heat transfer from the heating element 3 to the second temperature sensing element 5, the movement of the gas G in the mounting surface orthogonal direction in the vicinity of the second temperature sensing element 5 becomes predominant to a certain degree. In brief, the acceleration acting on the gas G in the mounting surface orthogonal direction does not affect the heat-transfer path p, but affects the heat-transfer path q. Consequently, by making a comparison between the temperature measurement results of the first temperature sensing element 4 and the second temperature sensing element 5, it is possible to detect the acceleration acting on the gas G in the mounting surface orthogonal direction.

FIG. 6 shows a comparator circuit configured to make a comparison between the temperature measurement results of the first temperature sensing element 4 and the second temperature sensing element 5. It is preferable to adopt, as the first temperature sensing element 4 and the second temperature sensing element 5, a temperature-dependent resistor, the resistance value of which varies depending on temperature. As shown in FIG. 6, to the first temperature sensing element 4 and the second temperature sensing element 5, a constant-current source I is coupled, respectively, and through the first temperature sensing element 4 and the second temperature sensing element 5, a predetermined current is caused to flow, respectively. With this configuration, the voltage on the high-potential side of the first temperature sensing element 4 and the voltage on the high-potential side of the second temperature sensing element 5 are input to the operational amplifier 6. Then, a difference between the measurement result by the first temperature sensing element 4 and the measurement result by the second temperature sensing element 5 is taken out as an output voltage from the operational amplifier 6. After that, by monitoring the output voltage from the operational amplifier 6, it is possible to detect the acceleration in the mounting surface orthogonal direction.

In FIG. 4, note that it is preferable to arrange the second temperature sensing element 5 as close as possible to the small inner wall surface 9b in order to cause the direction of the flow of the gas G in the vicinity of the second temperature sensing element 5 to be more parallel to the mounting surface orthogonal direction. According to this configuration, it is possible to enhance the sensitivity of the acceleration detection of the acceleration sensor 1.

As above, the First Embodiment has been explained, and has the following features.

(1) The acceleration sensor 1 includes the outer frame body 2, the heating element 3, the first temperature sensing element 4 for temperature measurement and the second temperature sensing element 5 for temperature measurement, and the operational amplifier 6 (difference operation circuit). In the outer frame body 2, the fluid chamber 11 (fluid sealing chamber) capable of sealing a fluid inside thereof is formed. The heating element 3 is formed on the circuit mounting surface 12 (specific inner wall surface) which is a specific inner wall surface of the plurality of inner wall surfaces defining the fluid chamber 11. The first temperature sensing element 4 and the second temperature sensing element 5 are formed on the circuit mounting surface 12. As shown in FIG. 3, the distance D1 from the first temperature sensing element 4 to the heating element 3 is shorter than the distance D2 from the second temperature sensing element 5 to the heating element 3. The operational amplifier 6 calculates the difference between the measurement result by the first temperature sensing element 4 and the measurement result by the second temperature sensing element 5. According to the above configuration, it is possible to detect the acceleration in the direction orthogonal to the circuit mounting surface 12 by the calculation result by the operational amplifier 6. Furthermore, the calculation result of the difference by the operational amplifier 6 is used, and thus it is possible to remove the influences from the environmental temperature of the external environment by offsetting them each other.

In the First Embodiment described above, as the gas G, an inert gas such as nitrogen and argon is used. In place of this, however, as the gas G, air or helium may be used. Helium has thermal conductivity higher than that of nitrogen, and thus helium is more excellent in terms of the sensitivity of the acceleration sensor 1. In contrast, the molecule of helium is small, and thus there is a disadvantage that helium tends to leak from the fluid chamber 11.

Furthermore, in terms of the sensitivity of the acceleration sensor 1, it is preferable for the distance D2 in FIG. 3 to be as large as possible (for example, hundreds of micrometers) and for the distance D1 to be as small as possible. When making a comparison between FIG. 3 and FIGS. 5A and 5B, the dimension ratio shown in FIGS. 5A and 5B is closer to that of an actual device although the dimension ratio of the distance D1 and the distance D2 is not uniformed.

Second Embodiment

Next, with reference to FIG. 7 to FIG. 10, a Second Embodiment will be explained. Here, points of the present embodiment different from those of the First Embodiment described above will be explained mainly and duplicated explanation is omitted appropriately. Furthermore, to components corresponding to the respective components of the First Embodiment described above, the same symbols are attached as a principle.

Figure 7:
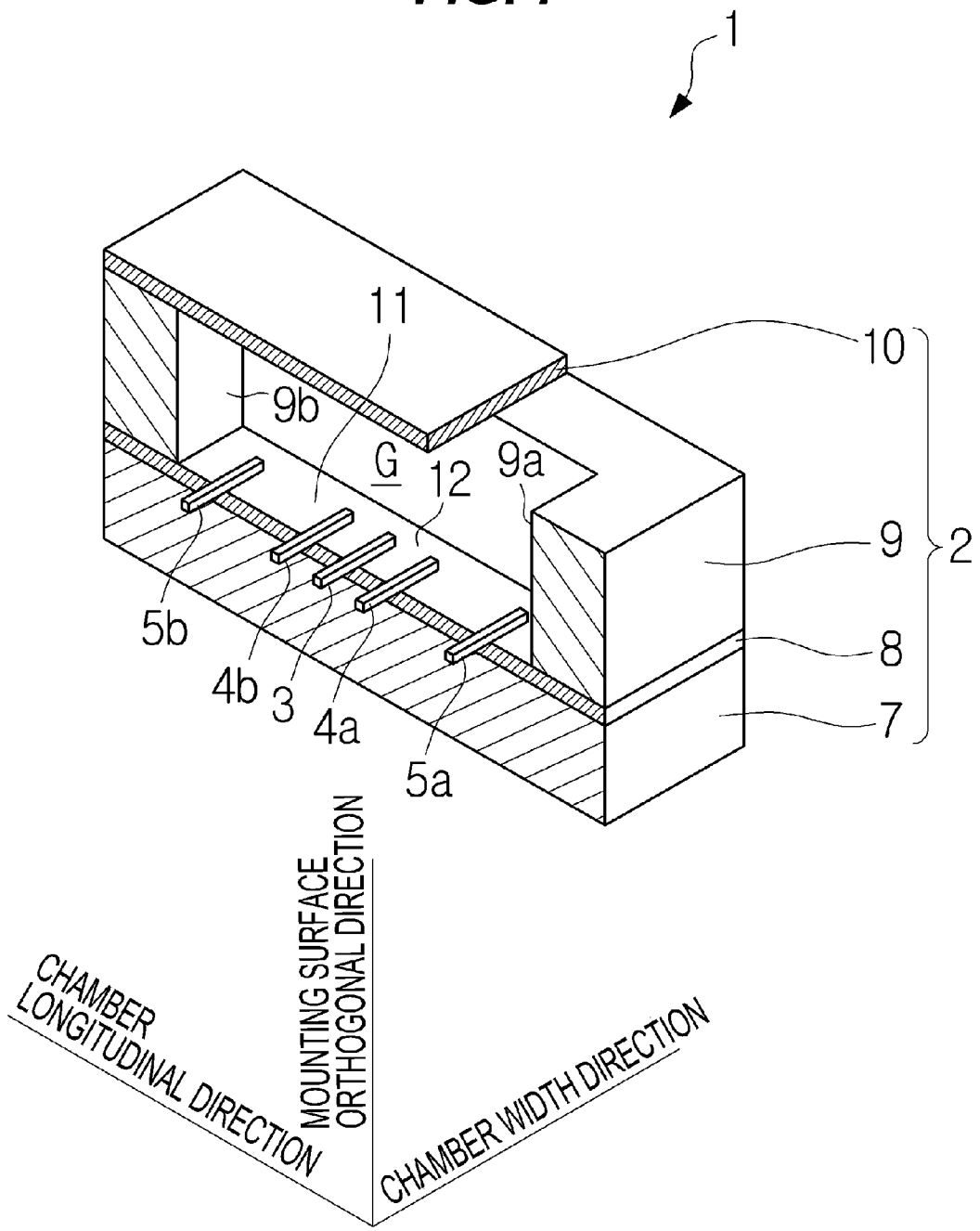
FIG. 7 is a partially cutaway perspective view of an acceleration sensor (Second Embodiment)
Figure 8:
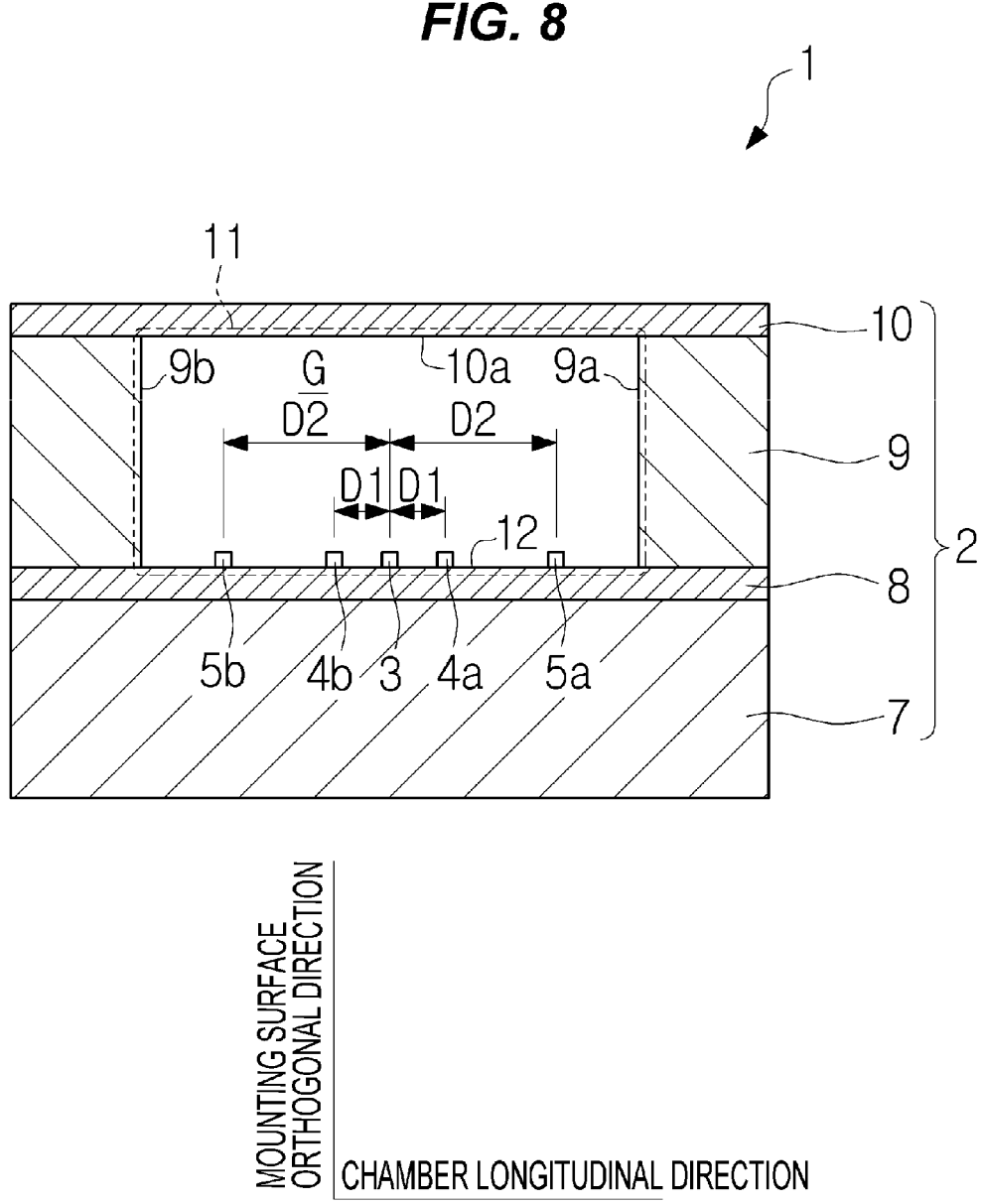
FIG. 8 is a cross-sectional view of the acceleration sensor (Second Embodiment)

As shown in FIG. 7 and FIG. 8, in the present embodiment, on the circuit mounting surface 12, there are arranged a pair of first temperature sensing element 4a and first temperature sensing element 4b for temperature measurement and a pair of second temperature sensing element 5a and second temperature sensing element 5b for temperature measurement. The pair of first temperature sensing element 4a and first temperature sensing element 4b and the pair of second temperature sensing element 5a and second temperature sensing element 5b each have a shape elongated along the chamber width direction. Then, the heating element 3, the first temperature sensing element 4a, the first temperature sensing element 4b, the second temperature sensing element 5a, and the second temperature sensing element 5b are each formed over the circuit mounting surface 12 so as to be parallel to the circuit mounting surface 12. As shown in FIG. 7 and FIG. 8, the second temperature sensing element 5a, the first temperature sensing element 4a, the heating element 3, the first temperature sensing element 4b, and the second temperature sensing element 5b are arranged in this order from the small inner wall surface 9a toward the small inner wall surface 9b. The heating element 3, the pair of first temperature sensing element 4a and first temperature sensing element 4b, and the pair of second temperature sensing element 5a and second temperature sensing element 5b are arranged side by side in a line along the chamber longitudinal direction. The heating element 3 is arranged at the center in the chamber longitudinal direction of the fluid chamber 11. The pair of first temperature sensing element 4a and first temperature sensing element 4b is arranged at the same distance from the heating element 3. The pair of first temperature sensing element 4a and first temperature sensing element 4b is arranged so as to sandwich the heating element 3. The pair of second temperature sensing element 5a and second temperature sensing element 5b is arranged at the same distance from the heating element 3. The pair of second temperature sensing element 5a and second temperature sensing element 5b is arranged so as to sandwich the heating element 3. Then, the distance D1 from the pair of first temperature sensing element 4a and first temperature sensing element 4b to the heating element 3 is shorter than the distance D2 from the pair of second temperature sensing element 5a and second temperature sensing element 5b to the heating element 3.

Figure 9:
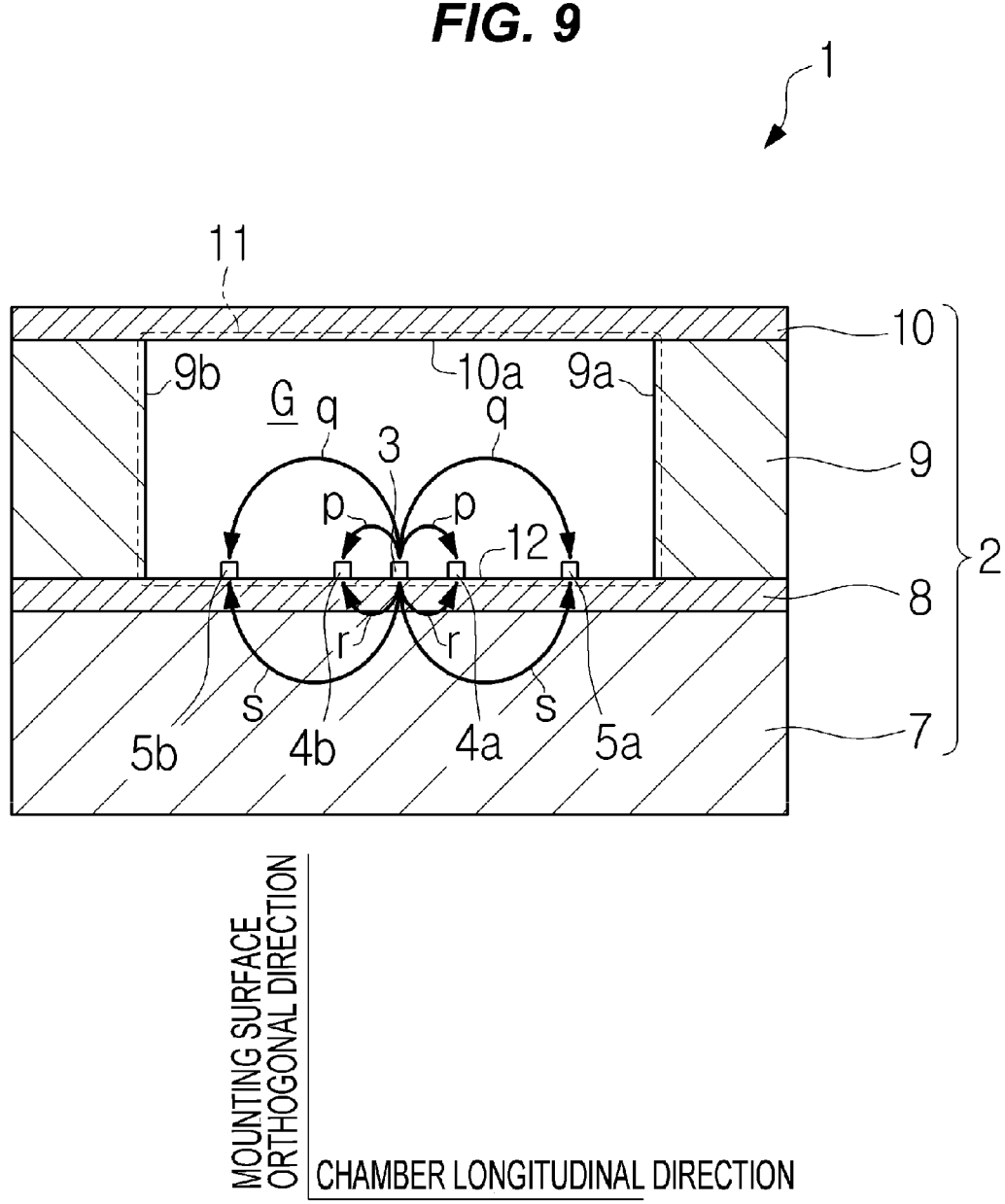
FIG. 9 is a cross-sectional view when movement of heat is imaged (Second Embodiment)

With the above configuration, when the heating element 3 is caused to produce heat by causing a current to flow through the heating element 3, a heat-transfer phenomenon as shown by thick lines in FIG. 9 occurs. In FIG. 9, a heat-transfer path from the heating element 3 to the first temperature sensing element 4a and the first temperature sensing element 4b, via the gas G sealed in the fluid chamber 11 is shown by the heat-transfer path p. In the same manner, a heat-transfer path from the heating element 3 to the second temperature sensing element 5a and the second temperature sensing element 5b, via the gas G sealed in the fluid chamber 11 is shown by the heat-transfer path q. In the same manner, a heat-transfer path from the heating element 3 to the first temperature sensing element 4a and the first temperature sensing element 4b, via the Si substrate 7 and the first insulating layer 8 is shown by the heat-transfer path r. In the same manner, a heat-transfer path from the heating element 3 to the second temperature sensing element 5a and the second temperature sensing element 5b, via the Si substrate 7 and the first insulating layer 8 is shown by the heat-transfer path s.

Here, the heat-transfer path r and the heat-transfer path s are not affected at all even if the acceleration sensor 1 is accelerated in any direction. In contrast to this, the heat-transfer path p and the heat-transfer path q are affected in a variety of manners by the acceleration of the acceleration sensor 1 since the gas G sealed in the fluid chamber 11 moves if the acceleration sensor 1 is accelerated in any of the directions. Note that, generally, the thermal conductivity of the Si substrate 7 and the first insulating layer 8 is higher than that of the gas G. Consequently, the conduction of heat from the heating element 3 to the first temperature sensing element 4a and the first temperature sensing element 4b and from the heating element 3 to the second temperature sensing element 5a and the second temperature sensing element 5b is mainly through the heat-transfer path r and the heat-transfer path s and is subordinately through the heat-transfer path p and the heat-transfer path q.

When making a comparison between the heat-transfer path p from the heating element 3 to the first temperature sensing element 4a and the first temperature sensing element 4b, and the heat-transfer path q from the heating element 3 to the second temperature sensing element 5a and the second temperature sensing element 5b, the latter is more likely to be affected by the acceleration acting on the gas G in the mounting surface orthogonal direction than the former. This is because, in the case of the heat transfer from the heating element 3 to the first temperature sensing element 4a and the first temperature sensing element 4b, the heat transfer becomes strong and predominant in the chamber longitudinal direction, whereas in the case of the heat transfer from the heating element 3 to the second temperature sensing element 5a and the second temperature sensing element 5b, the movement of the gas G in the mounting surface orthogonal direction in the vicinity of the second temperature sensing element 5a and the second temperature sensing element 5b becomes predominant to a certain degree. In brief, the acceleration acting on the gas G in the mounting surface orthogonal direction does not affect the heat-transfer path p, but affects the heat-transfer path q. Consequently, by making a comparison between the temperature measurement results of the first temperature sensing element 4a and the first temperature sensing element 4b and the second temperature sensing element 5a and the second temperature sensing element 5b, it is possible to detect the acceleration acting on the gas G in the mounting surface orthogonal direction.

Here, the mechanism of acceleration detection in the present embodiment will be explained in detail. First, refer to formulas (1) to (4) below.

[Formula 1]

$$T_{4a} = T_{40} + \Delta T_{H4} + \Delta T_{V4} \qquad (1)$$

[Formula 2]

$$T_{4b} = T_{40} - \Delta T_{H4} + \Delta T_{V4} \qquad (2)$$

[Formula 3]

$$T_{5a} = T_{50} + \Delta T_{H5} + \Delta T_{V5} \qquad (3)$$

[Formula 4]

$$T_{5b} = T_{50} - \Delta T_{H5} + \Delta T_{V5} \qquad (4)$$

Here, $T_{40}$ is a measurement result of the first temperature sensing element 4a and the first temperature sensing element 4b in the state where the acceleration sensor 1 is not accelerated. $T_{50}$ is a measurement result of the second temperature sensing element 5a and the second temperature sensing element 5b in the state where the acceleration sensor 1 is not accelerated. $T_{4a}$ is a measurement result of the first temperature sensing element 4a. $T_{4b}$ is a measurement result of the first temperature sensing element 4b. $T_{5a}$ is a measurement result of the second temperature sensing element 5a. $T_{5b}$ is a measurement result of the second temperature sensing element 5b. $\Delta T_{H4}$ is a change in temperature that occurs in the first temperature sensing element 4a and the first temperature sensing element 4b by the acceleration having acted in the chamber longitudinal direction. $\Delta T_{H5}$ is a change in temperature that occurs in the second temperature sensing element 5a and the second temperature sensing element 5b by the acceleration having acted in the chamber longitudinal direction. $\Delta T_{V4}$ is a change in temperature that occurs in the first temperature sensing element 4a and the first temperature sensing element 4b by the acceleration having acted in the mounting surface orthogonal direction. $\Delta T_{V5}$ is a change in temperature that occurs in the second temperature sensing element 5a and the second temperature sensing element 5b by the acceleration having acted in the mounting surface orthogonal direction.

In the formulas (1) to (4) described above, as to $\Delta T_{H4}$, the first temperature sensing element 4a and the first temperature sensing element 4b are arranged at the same distance from the heating element 3 so as to sandwich the heating element 3, and thus the absolute values of the measurement results of the first temperature sensing element 4a and the first temperature sensing element 4b are equal to each other, and the $\Delta T_{H4}$ acts, with signs opposite to each other, on the measurement results. As to $\Delta T_{H5}$, the second temperature sensing element 5a and the second temperature sensing element 5b are arranged at the same distance from the heating element 3 so as to sandwich the heating element 3, and thus the absolute values of the measurement results of the second temperature sensing element 5a and the second temperature sensing element 5b are equal to each other, and the $\Delta T_{H5}$ acts, with signs opposite to each other, on the measurement results. As to $\Delta T_{V4}$, the first temperature sensing element 4a and the first temperature sensing element 4b are arranged at the same distance from the heating element 3, and thus the absolute values of the measurement results of the first temperature sensing element 4a and the first temperature sensing element 4b are equal to each other, and the $\Delta T_{H5}$ acts, with the same signs as each other, on the measurement results. As to $\Delta T_{V5}$, the second temperature sensing element 5a and the second temperature sensing element 5b are arranged at the same distance from the heating element 3, and thus the absolute values of the measurement results of the second temperature sensing element 5a and the second temperature sensing element 5b are equal to each other, and the $\Delta T_{V5}$ acts, with the same signs as each other, on the measurement results.

From the formulas (1) and (2) described above, a formula (5) below is derived.

[Formula 5]

$$T_{sum4} = T_{4a} + T_{4b} = 2T_{40} + 2\Delta T_{V4} \quad (5)$$

From the formulas (3) and (4) described above, a formula (6) below is derived.

[Formula 6]

$$T_{sum5} = T_{5a} + T_{5b} = 2T_{50} + 2\Delta T_{V5} \quad (6)$$

From the formulas (5) and (6) described above, a formula (7) below is derived.

[Formula 7]

$$T_{sum4} - T_{sum5} = 2T_{40} - 2T_{50} + 2\Delta T_{V4} + 2\Delta T_{V5} \quad (7)$$

According to the above-mentioned formulas (5) to (7), if a difference between the sum of the respective measurement results of the first temperature sensing element 4a and the first temperature sensing element 4b and the sum of the respective measurement results of the second temperature sensing element 5a and the second temperature sensing element 5b is calculated, the terms of the temperature change resulting from the acceleration component in the chamber longitudinal direction are offset each other, and thus only the terms of the temperature change resulting from the acceleration component in the mounting surface orthogonal direction are left. Consequently, according to the above-mentioned formula (7), it is possible to detect the acceleration component in the mounting surface orthogonal direction regardless of the presence or absence of the acceleration component in the chamber longitudinal direction. The temperature change resulting from the acceleration component in the chamber width direction does not occur originally if the heating element 3, the first temperature sensing element 4a and the first temperature sensing element 4b, and the second temperature sensing element 5a and the second temperature sensing element 5b are arranged so as to be elongated along the chamber width direction as in FIG. 7, and thus the temperature change is not referred to in particular.

Figure 10:
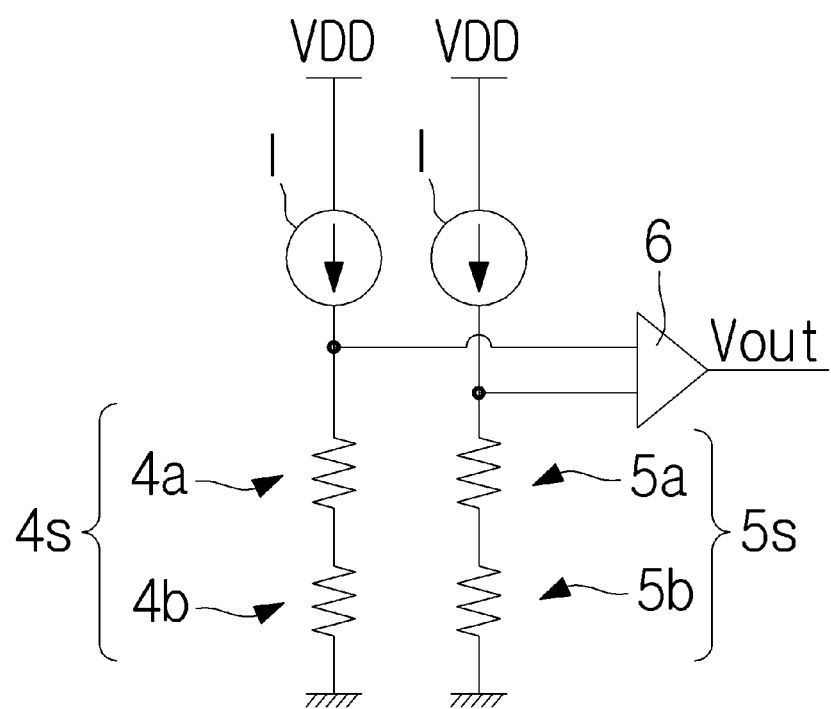
FIG. 10 is a circuit diagram of the acceleration sensor (Second Embodiment)

FIG. 10 shows a first sum total operation circuit 4s (first sum total operation circuit) configured to calculate the sum $T_{sum4}$ of the measurement results by the pair of first temperature sensing element 4a and first temperature sensing element 4b, a second sum total operation circuit 5s (second sum total operation circuit) configured to calculate the sum $T_{sum5}$ of the measurement results by the pair of second temperature sensing element 5a and second temperature sensing element 5b, and the operational amplifier 6 (difference operation circuit) configured to calculate a difference between the calculation result by the first sum total operation circuit 4s and the calculation result by the second sum total operation circuit 5s. As shown in FIG. 10, the first sum total operation circuit 4s is realized as a circuit in which the first temperature sensing element 4a and the first temperature sensing element 4b are coupled in series. The second sum total operation circuit 5s is realized as a circuit in which the second temperature sensing element 5a and the second temperature sensing element 5b are coupled in series. Then, to the first sum total operation circuit 4s and the second sum total operation circuit 5s, the constant-current source I is coupled, respectively, and a predetermined current is caused to flow through the first sum total operation circuit 4s and the second sum total operation circuit 5s, respectively. With this configuration, the voltage on the high-potential side of the first sum total operation circuit 4s and the voltage on the high-potential side of the second sum total operation circuit 5s are input to the operational amplifier 6. Then, the difference between the calculation result by the first sum total operation circuit 4s and the calculation result by the second sum total operation circuit 5s is taken out as an output voltage from the operational amplifier 6. After that, by monitoring the output voltage from the operational amplifier 6, it is possible to detect the acceleration in the mounting surface orthogonal direction.

Note that, in FIG. 9, it is preferable to arrange the second temperature sensing element 5a and the second temperature sensing element 5b as close as possible to the small inner wall surface 9a and the small inner wall surface 9b, respectively, in order to cause the direction of the flow of the gas G in the vicinity of the second temperature sensing element 5a and the second temperature sensing element 5b to be more parallel to the mounting surface orthogonal direction. According to this configuration, it is possible to enhance sensitivity of the acceleration detection of the acceleration sensor 1.

As above, the Second Embodiment has been explained, and has the following features.

(2) The acceleration sensor 1 includes the outer frame body 2, the heating element 3, the first temperature sensing element 4a and the first temperature sensing element 4b for temperature measurement, the second temperature sensing element 5a and the second temperature sensing element 5b for temperature measurement, the first sum total operation circuit 4s (first sum total operation circuit), the second sum total operation circuit 5s (second sum total operation circuit), and the operational amplifier 6 (difference operation circuit). In the outer frame body 2, the fluid chamber 11 (fluid sealing chamber) capable of sealing a fluid inside thereof is formed. The heating element 3 is formed on the circuit mounting surface 12 (specific inner wall surface) which is a specific inner wall surface of the plurality of inner wall surfaces defining the fluid chamber 11. The first temperature sensing element 4a and the first temperature sensing element 4b are formed on the circuit mounting surface 12. The second temperature sensing element 5a and the second temperature sensing element 5b are formed on the circuit mounting surface 12. The pair of first temperature sensing element 4a and first temperature sensing element 4b is arranged at the same distance from the heating element 3. The pair of first temperature sensing element 4a and first temperature sensing element 4b is arranged so as to sandwich the heating element 3. The pair of second temperature sensing element 5a and second temperature sensing element 5b is arranged at the same distance from the heating element 3. The pair of second temperature sensing element 5a and second temperature sensing element 5b is arranged so as to sandwich the heating element 3. The distance D1 from the pair of first temperature sensing element 4a and first temperature sensing element 4b to the heating element 3 is shorter than the distance D2 from the pair of second temperature sensing element 5a and second temperature sensing element 5b to the heating element 3. The first sum total operation circuit 4s calculates the sum total of the measurement results by the pair of first temperature sensing element 4a and first temperature sensing element 4b. The second sum total operation circuit 5s calculates the sum total of the measurement results by the pair of second temperature sensing element 5a and second temperature sensing element 5b. The operational amplifier 6 calculates the difference between the calculation result by the first sum total operation circuit 4s and the calculation result by the second sum total operation circuit 5s. According to the above configuration, it is possible to detect the acceleration in the direction orthogonal to the circuit mounting surface 12 by the calculation result by the operational amplifier 6. Furthermore, the calculation result of the difference by the operational amplifier 6 is used, and thus it is possible to remove the influences from the environmental temperature of the external environment by offsetting them each other. Moreover, the calculation results of the sum of the first sum total operation circuit 4s and the second sum total operation circuit 5s are used, and thus it is possible to remove the influences by the acceleration component in the direction parallel to the circuit mounting surface 12 by offsetting them each other.

(3) In addition, the heating element 3, the pair of first temperature sensing element 4a and first temperature sensing element 4b, and the pair of second temperature sensing element 5a and second temperature sensing element 5b are arranged side by side in a line along the chamber longitudinal direction. According to the above configuration, it is possible to form the acceleration sensor 1 into a compact one.

Third Embodiment

Next, with reference to FIGS. 11 to 13, a Third Embodiment will be explained. Here, different points between the present embodiment and the Second Embodiment described above will be explained mainly and duplicated explanation is omitted appropriately. Further, to components corresponding to the respective components of the Second Embodiment described above, the same symbols are attached as a principle.

Figure 11:
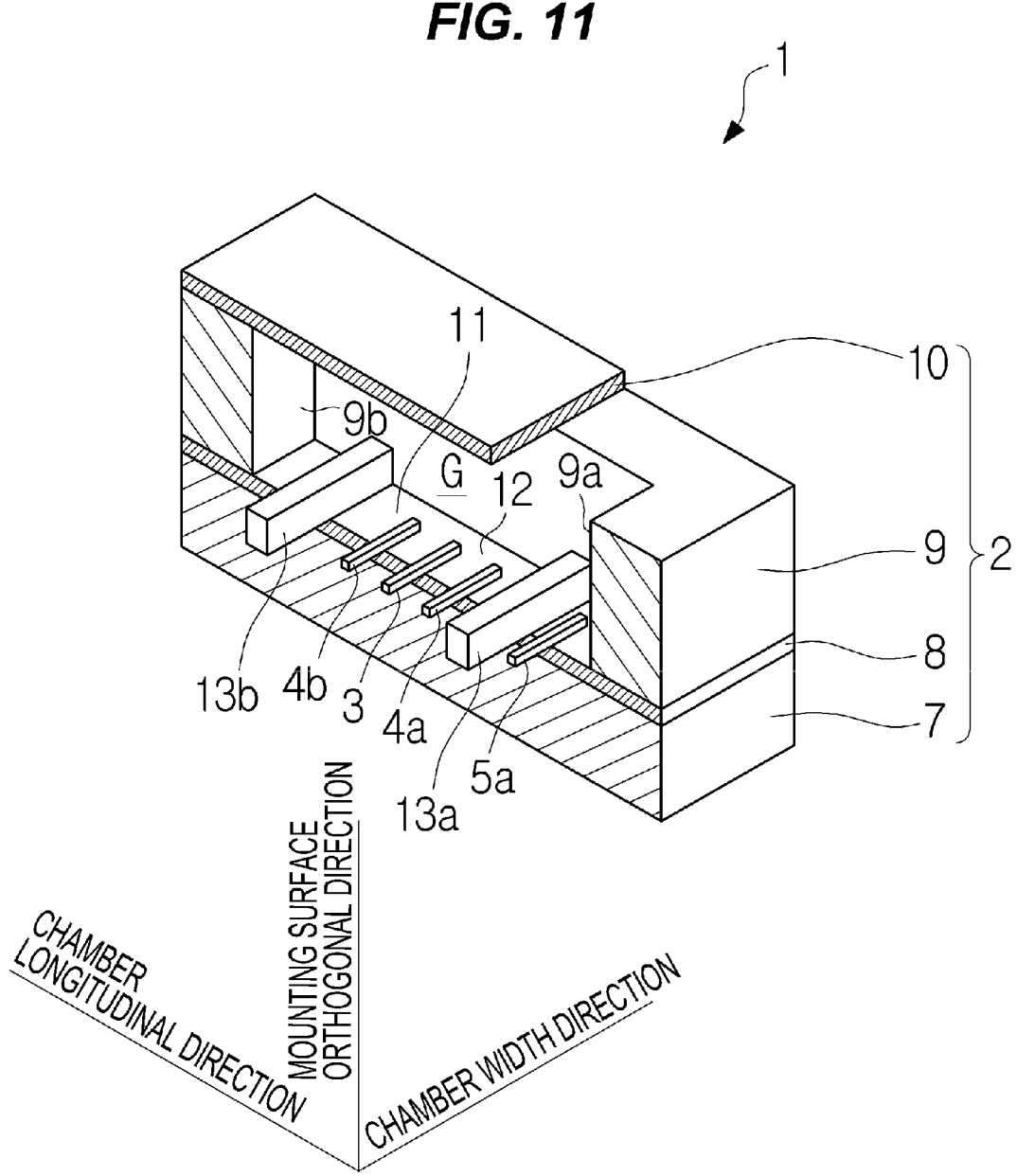
FIG. 11 is a partially cutaway perspective view of an acceleration sensor (Third Embodiment)
Figure 12:
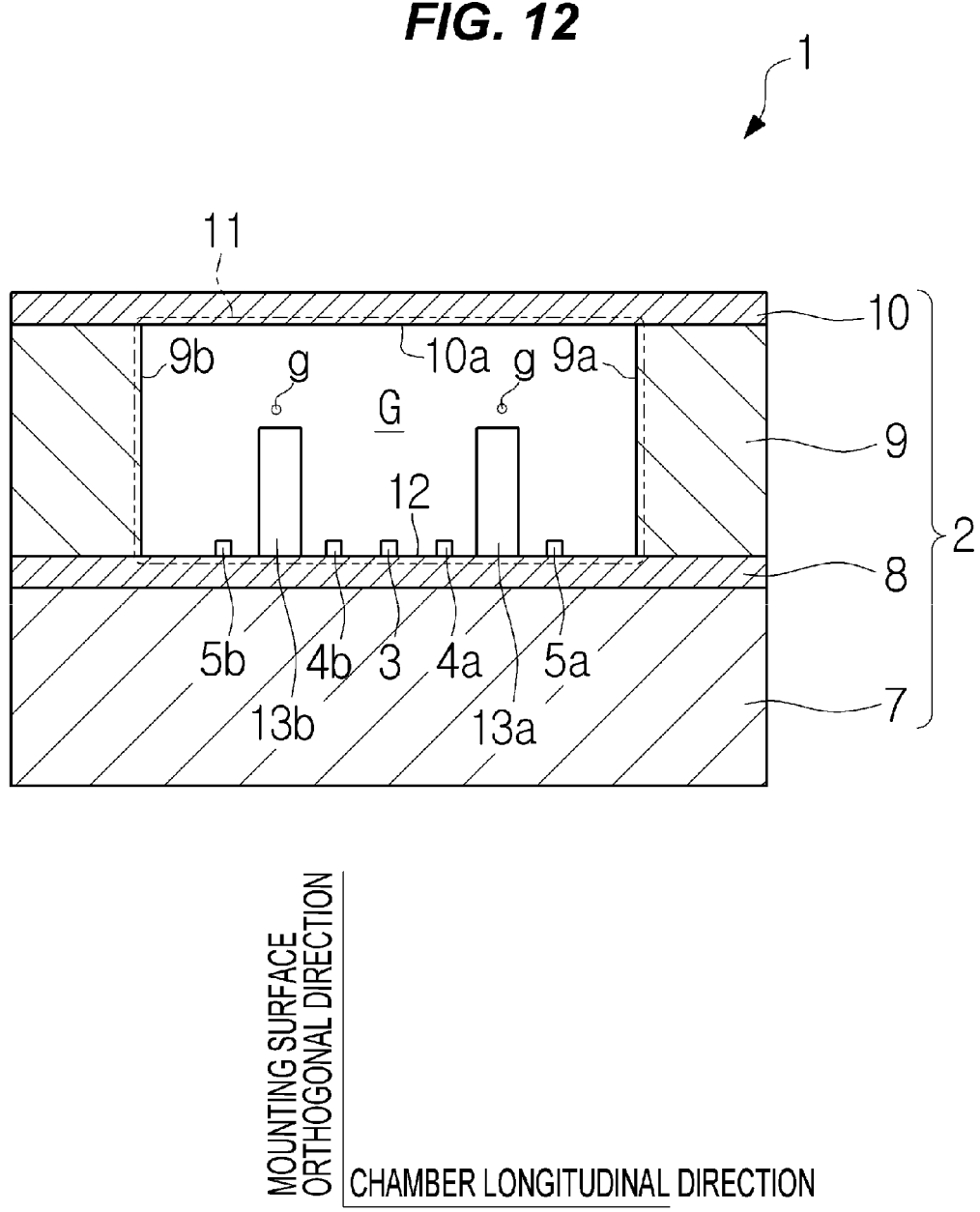
FIG. 12 is a cross-sectional view of the acceleration sensor (Third Embodiment)
Figure 13:
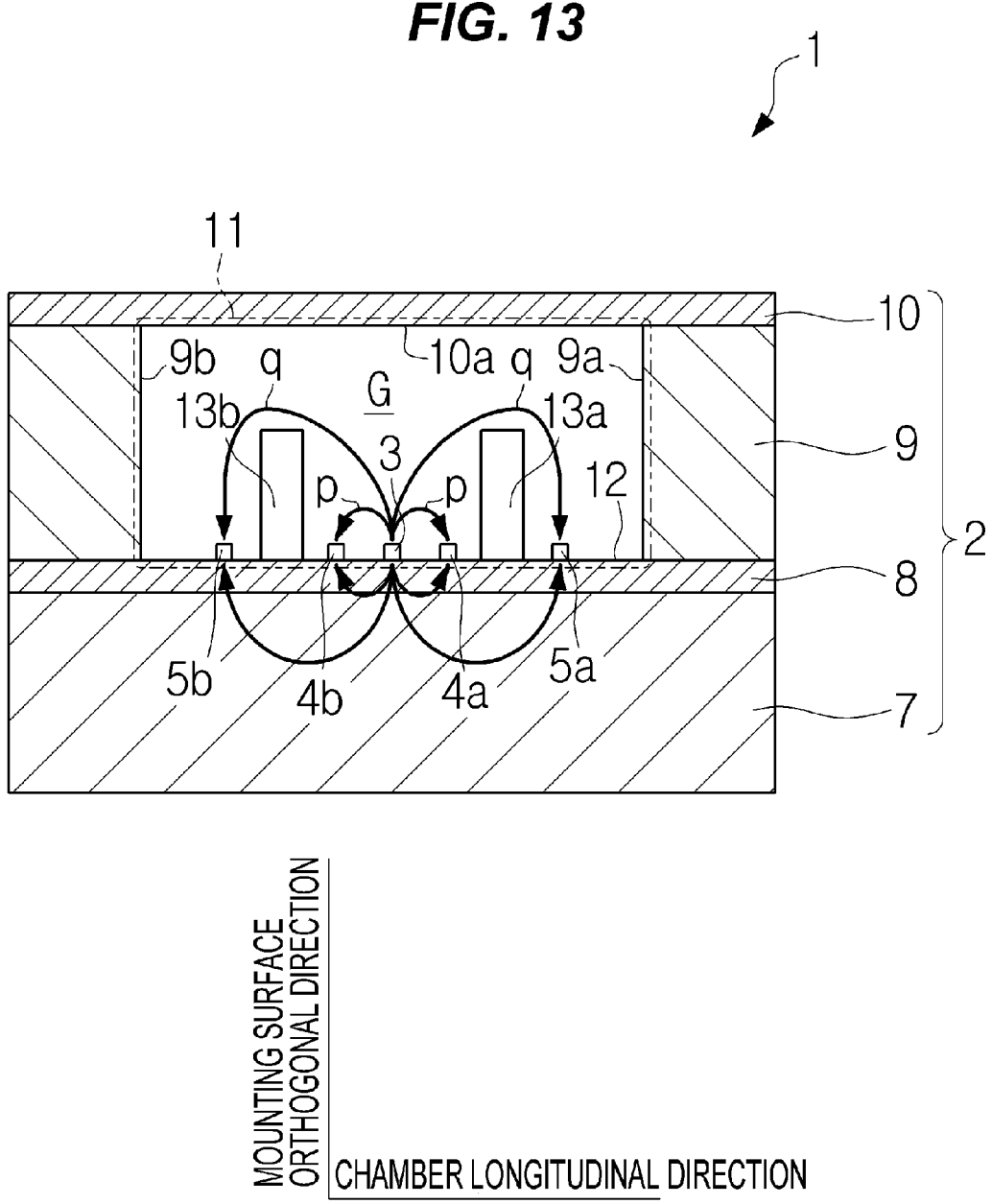
FIG. 13 is a cross-sectional view when movement of heat is imaged (Third Embodiment)

As shown in FIG. 11 and FIG. 12, in the present embodiment, the acceleration sensor 1 includes a pair of inner fluid control protrusion part 13a and inner fluid control protrusion part 13b. The inner fluid control protrusion part 13a is arranged between the first temperature sensing element 4a and the second temperature sensing element 5a. The inner fluid control protrusion part 13b is arranged between the first temperature sensing element 4b and the second temperature sensing element 5b. The inner fluid control protrusion part 13a and the inner fluid control protrusion part 13b are formed so as to protrude in the mounting surface leaving direction from the circuit mounting surface 12. Specifically, the amount of protrusion of the inner fluid control protrusion part 13a and the inner fluid control protrusion part 13b is smaller than the thickness in the mounting surface orthogonal direction of the second insulating layer 9, and is larger than the thickness in the mounting surface orthogonal direction of the metal wiring constituting the heating element 3, the first temperature sensing element 4a and the first temperature sensing element 4b, and the second temperature sensing element 5a and the second temperature sensing element 5b. As shown in FIG. 12, in the present embodiment, the amount of protrusion of the inner fluid control protrusion part 13a and the inner fluid control protrusion part 13b is approximately half the thickness in the mounting surface orthogonal direction of the second insulating layer 9. Consequently, between the inner fluid control protrusion part 13a and the ceiling surface 10a of the third insulating layer 10, and between the inner fluid control protrusion part 13b and the ceiling surface 10a of the third insulating layer 10, a gap g in which the gas G can flow is left. As shown in FIG. 13, the inner fluid control protrusion part 13a and the inner fluid control protrusion part 13b can prevent the movement of the gas G in the chamber longitudinal direction, in the vicinity of the first insulating layer 8, from the heating element 3 toward the second temperature sensing element 5a and the second temperature sensing element 5b, and thus, for the measurement results of the second temperature sensing element 5a and the second temperature sensing element 5b, the acceleration component in the mounting surface orthogonal direction becomes more predominant. Consequently, the sensitivity of the acceleration sensor 1 for the acceleration component in the mounting surface orthogonal direction is further improved.

As above, the Third Embodiment has been explained, and has the following feature.

(4) The acceleration sensor 1 further includes the pair of inner fluid control protrusion part 13a and inner fluid control protrusion part 13b which is arranged between the pair of first temperature sensing element 4a and first temperature sensing element 4b, and the pair of second temperature sensing element 5a and second temperature sensing element 5b, respectively, and which is formed so as to protrude from the circuit mounting surface 12. According to the above configuration, the detection sensitivity of the acceleration component in the mounting surface orthogonal direction is improved.

Note that, in FIG. 12, the thickness in the chamber longitudinal direction of the inner fluid control protrusion part 13a and the inner fluid control protrusion part 13b is drawn so as to be smaller than the amount of protrusion of the inner fluid control protrusion part 13a and the inner fluid control protrusion part 13b. However, actually, due to manufacturing reasons, the thickness in the chamber longitudinal direction of the inner fluid control protrusion part 13a and the inner fluid control protrusion part 13b is substantially equal to the amount of protrusion of the inner fluid control protrusion part 13a and the inner fluid control protrusion part 13b.

Fourth Embodiment

Next, with reference to FIGS. 14 to 16, a Fourth Embodiment will be explained. Here, different points between the present embodiment and the Third Embodiment described above will be explained mainly and duplicated explanation is omitted appropriately. Further, to components corresponding to the respective components of the Third Embodiment described above, the same symbols are attached as a principle.

Figure 14:
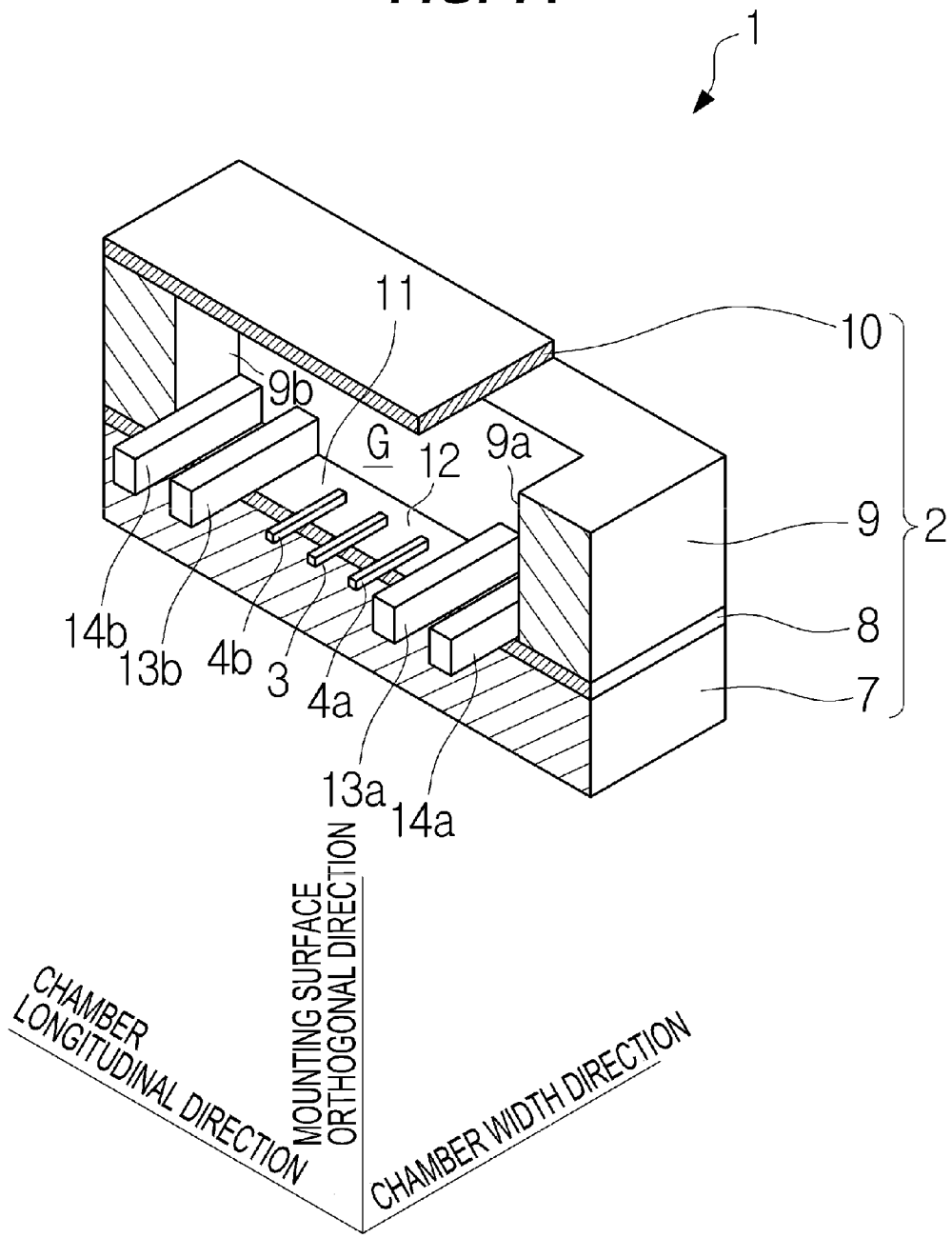
FIG. 14 is a partially cutaway perspective view of an acceleration sensor (Fourth Embodiment)
Figure 15:
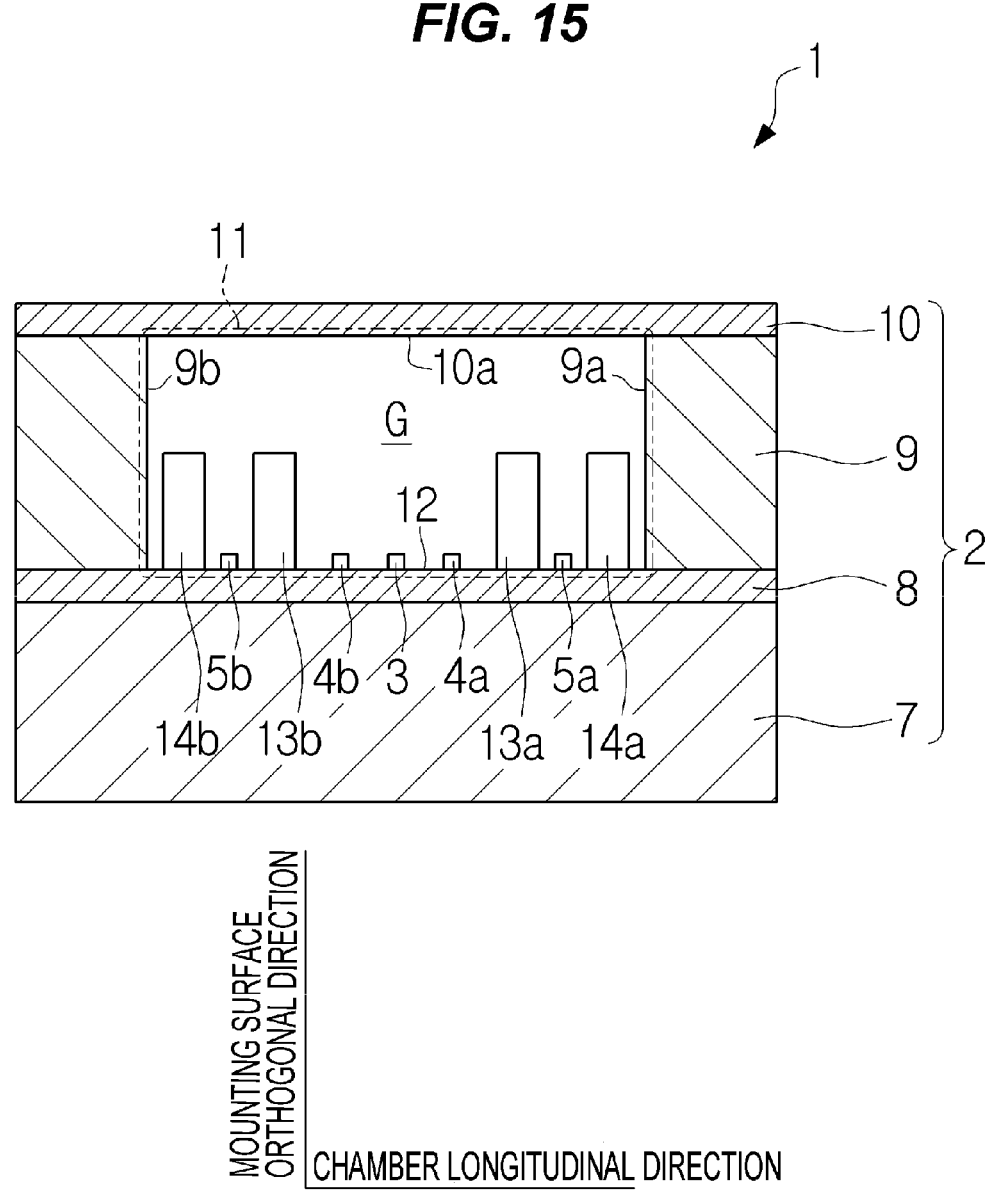
FIG. 15 is a cross-sectional view of the acceleration sensor (Fourth Embodiment)
Figure 16:
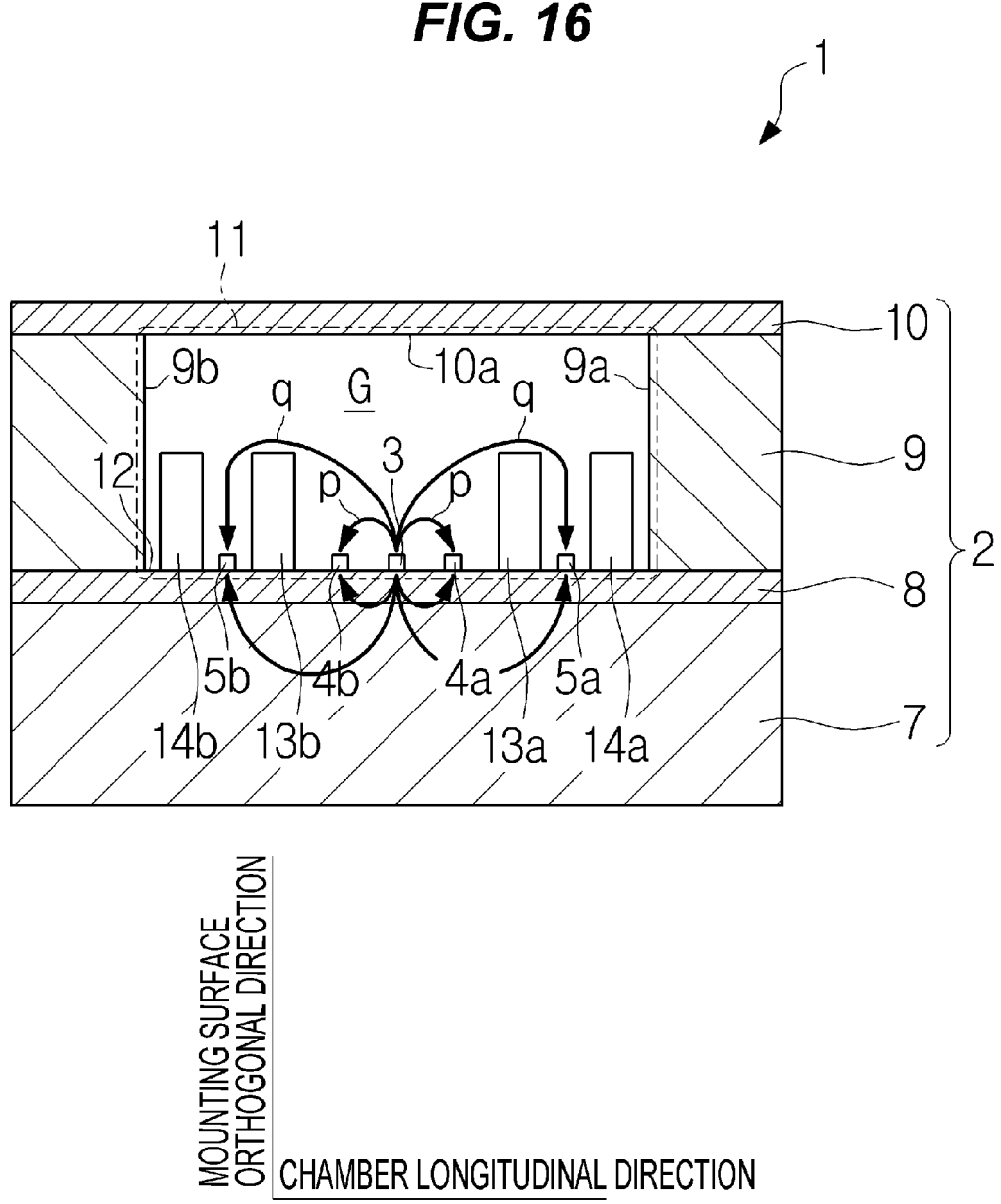
FIG. 16 is a cross-sectional view when movement of heat is imaged (Fourth Embodiment).

As shown in FIG. 14 and FIG. 15, in the present embodiment, the acceleration sensor 1 further includes a pair of outer fluid control protrusion part 14a and outer fluid control protrusion part 14b. As shown in FIG. 15, the outer fluid control protrusion part 14a is arranged on the opposite side of the inner fluid control protrusion part 13a with the second temperature sensing element 5a being sandwiched in between. The outer fluid control protrusion part 14b is arranged on the opposite side of the inner fluid control protrusion part 13b with the second temperature sensing element 5b being sandwiched in between. The outer fluid control protrusion part 14a and the outer fluid control protrusion part 14b are formed so as to protrude in the mounting surface leaving direction from the circuit mounting surface 12. Specifically, the amount of protrusion of the outer fluid control protrusion part 14a and the outer fluid control protrusion part 14b is smaller than the thickness in the mounting surface orthogonal direction of the second insulating layer 9, and is larger than the thickness in the mounting surface orthogonal direction of the metal wiring constituting the heating element 3, the first temperature sensing element 4a and the first temperature sensing element 4b, and the second temperature sensing element 5a and the second temperature sensing element 5b. As shown in FIG. 15, in the present embodiment, the amount of protrusion of the outer fluid control protrusion part 14a and the outer fluid control protrusion part 14b is approximately half the thickness in the mounting surface orthogonal direction of the second insulating layer 9. Furthermore, the amount of protrusion of the outer fluid control protrusion part 14a and the outer fluid control protrusion part 14b is equal to the amount of protrusion of the inner fluid control protrusion part 13a and the inner fluid control protrusion part 13b. As shown in FIG. 16, by being sandwiched by the inner fluid control protrusion part 13a and the outer fluid control protrusion part 14a, the flow of the gas G in the vicinity of the second temperature sensing element 5a is greatly restricted so as to be in the mounting surface orthogonal direction. Consequently, the dependence of the measurement result of the second temperature sensing element 5a on the acceleration component in the mounting surface orthogonal direction is increased. In the same manner, by being sandwiched by the inner fluid control protrusion part 13b and the outer fluid control protrusion part 14b, the flow of the gas Gin the vicinity of the second temperature sensing element 5b is greatly restricted so as to be in the mounting surface orthogonal direction. Therefore, the dependence of the measurement result of the second temperature sensing element 5b on the acceleration component in the mounting surface orthogonal direction is increased. As a result, the sensitivity of the acceleration sensor 1 for the acceleration component in the mounting surface orthogonal direction is improved greatly.

Furthermore, it is possible to form the inner fluid control protrusion part 13a and the outer fluid control protrusion part 14a, at the same time in the same process. Consequently, it is possible to form the inner fluid control protrusion part 13a and the outer fluid control protrusion part 14a with high accuracy with respect to the second temperature sensing element 5a. In the same manner, it is possible to form the inner fluid control protrusion part 13b and the outer fluid control protrusion part 14b, at the same time in the same process. Consequently, it is possible to form the inner fluid control protrusion part 13b and the outer fluid control protrusion part 14b with high accuracy with respect to the second temperature sensing element 5b.

As above, the Fourth Embodiment has been explained, and has the following features.

(5) The acceleration sensor 1 further includes the pair of outer fluid control protrusion part 14a and outer fluid control protrusion part 14b which is arranged on the opposite sides of the pair of inner fluid control protrusion part 13a and inner fluid control protrusion part 13b, respectively, with the pair of second temperature sensing element 5a and second temperature sensing element 5b being sandwiched in between, respectively, and which is formed so as to protrude from the circuit mounting surface 12. According to the above configuration, the sensitivity of the acceleration sensor 1 for the acceleration component in the mounting surface orthogonal direction is improved greatly.

(6) Furthermore, the amount of protrusion of the pair of inner fluid control protrusion part 13a and inner fluid control protrusion part 13b is equal to the amount of protrusion of the pair of outer fluid control protrusion part 14a and outer fluid control protrusion part 14b. According to the above configuration, it is possible to form the inner fluid control protrusion part 13a and the inner fluid control protrusion part 13b, and the outer fluid control protrusion part 14a and the outer fluid control protrusion part 14b, at the same time in the same process.

Note that, in FIG. 15, the thickness in the chamber longitudinal direction of the outer fluid control protrusion part 14a and the outer fluid control protrusion part 14b is drawn as being smaller than the amount of protrusion of the outer fluid control protrusion part 14a and the outer fluid control protrusion part 14b. However, actually, due to manufacturing reasons, the thickness in the chamber longitudinal direction of the outer fluid control protrusion part 14a and the outer fluid control protrusion part 14b is approximately equal to the amount of protrusion of the outer fluid control protrusion part 14a and the outer fluid control protrusion part 14b.

As above, the invention made by the inventor has been explained specifically on the basis of the embodiments, but it is needless to say that the present invention is not limited to the embodiments already described and various modifications are possible within the scope not deviating from the gist of the invention.

What is claimed is:

1. An acceleration sensor comprising:
    an outer frame body in which a fluid sealing chamber capable of sealing a fluid inside thereof is formed;
    a heating element formed on a specific inner wall surface which is a specific inner wall surface of a plurality of inner wall surfaces defining the fluid sealing chamber;
    a first temperature sensing element for temperature measurement and a second temperature sensing element for temperature measurement, which are formed on the specific inner surface, with the distance from the first temperature sensing element to the heating element being shorter than the distance from the second temperature sensing element to the heating element; and
    a difference operation circuit configured to calculate a difference between a measurement result by the first temperature sensing element and a measurement result by the second temperature sensing element.

2. An acceleration sensor comprising:
    an outer frame body in which a fluid sealing chamber capable of sealing a fluid inside thereof is formed;
    a heating element formed on a specific inner wall surface which is a specific inner wall surface of a plurality of inner wall surfaces defining the fluid sealing chamber;
    a pair of first temperature sensing elements for temperature measurement and a pair of second temperature sensing elements for temperature measurement which are formed on the specific inner wall surface, with the pair of first temperature sensing elements being arranged at a same distance from the heating element, the pair of first temperature sensing elements being arranged so as to sandwich the heating element, the pair of second temperature sensing elements being arranged at a same distance from the heating element, the pair of second temperature sensing elements being arranged so as to sandwich the heating element, and the distance from the pair of first temperature sensing elements to the heating element being shorter than the distance from the pair of second temperature sensing elements to the heating element;

a first sum total operation circuit configured to calculate a sum total of measurement results by the pair of first temperature sensing elements;

a second sum total operation circuit configured to calculate a sum of measurement results by the pair of second temperature sensing elements; and a difference operation circuit configured to calculate a difference between a calculation result by the first sum total operation circuit and a calculation result by the second sum operation circuit.

3. The acceleration sensor according to claim 2, wherein the heating element, the pair of first temperature sensing elements, and the pair of second temperature sensing elements are arranged side by side in a line.

4. The acceleration sensor according to claim 3, further comprising:

a pair of inner fluid control protrusion parts which is arranged, respectively, between the pair of first temperature sensing elements and the pair of second temperature sensing elements, and which is formed so as to protrude from the specific inner wall surface.

5. The acceleration sensor according to claim 4, further comprising:

a pair of outer fluid control protrusion parts which is arranged, respectively, on the opposite sides of the pair of inner fluid control protrusion parts, with the pair of second temperature sensing elements being sandwiched in between, and which is formed so as to protrude from the specific inner wall surface.

6. The acceleration sensor according to claim 5, wherein an amount of protrusion of the pair of inner fluid control protrusion parts and an amount of protrusion of the pair of outer fluid control protrusion parts are equal to each other.

* * * * *